United States Patent
Pamukcu et al.

(10) Patent No.: US 9,555,454 B2
(45) Date of Patent: Jan. 31, 2017

(54) POLYMER COATED SAND AND METHODS OF MANUFACTURE AND USE

(71) Applicant: Lehigh University, Bethlehem, PA (US)

(72) Inventors: Sibel Pamukcu, Bethlehem, PA (US); Yi Dong, Behtlehem, PA (US)

(73) Assignee: Lehigh University, Bethlehem, PA (US)

( * ) Notice: Subject to any disclaimer, the term of this patent is extended or adjusted under 35 U.S.C. 154(b) by 353 days.

(21) Appl. No.: 14/212,202

(22) Filed: Mar. 14, 2014

(65) Prior Publication Data

US 2014/0262203 A1  Sep. 18, 2014

Related U.S. Application Data

(60) Provisional application No. 61/783,625, filed on Mar. 14, 2013.

(51) Int. Cl.
| | | |
|---|---|---|
| *B09C 1/02* | (2006.01) | |
| *B09C 1/00* | (2006.01) | |
| *E21B 43/02* | (2006.01) | |
| *C09K 8/52* | (2006.01) | |
| *C09K 8/58* | (2006.01) | |

(52) U.S. Cl.
CPC .................. *B09C 1/002* (2013.01); *B09C 1/00* (2013.01); *C09K 8/52* (2013.01); *C09K 8/58* (2013.01); *E21B 43/02* (2013.01)

(58) Field of Classification Search
CPC .................................. E21B 43/02; B09C 1/002
See application file for complete search history.

(56) References Cited

U.S. PATENT DOCUMENTS

| | | |
|---|---|---|
| 5,051,182 A | 9/1991 | Wang et al. |
| 7,160,379 B1 | 1/2007 | Shoshany et al. |
| 8,308,851 B2 | 11/2012 | Roberts |
| 8,312,928 B2 | 11/2012 | Lockhart et al. |
| 2010/0314329 A1 | 12/2010 | Prior |
| 2011/0309031 A1 | 12/2011 | Hawthorne |
| 2012/0015852 A1* | 1/2012 | Quintero ............... C09K 8/032 507/112 |
| 2012/0071371 A1 | 3/2012 | Zhang |
| 2013/0233545 A1* | 9/2013 | Mahoney ................ C09K 8/80 166/280.2 |

FOREIGN PATENT DOCUMENTS

| | | |
|---|---|---|
| CA | 2082165 C | 7/2002 |
| GB | 2203753 A | 3/1987 |
| JP | 2012091168 A | 5/2012 |
| WO | 2011/097735 | 8/2011 |

* cited by examiner

*Primary Examiner* — William P Neuder
(74) *Attorney, Agent, or Firm* — Blank Rome LLP

(57) ABSTRACT

Described herein are systems for manipulating a flowable substance, comprising: a flowable substance; a heating means; a cooling means; and a composition comprising chemically inert particles coated with a stimuli-responsive material. Compositions and methods for using the compositions are also described herein.

14 Claims, 3 Drawing Sheets

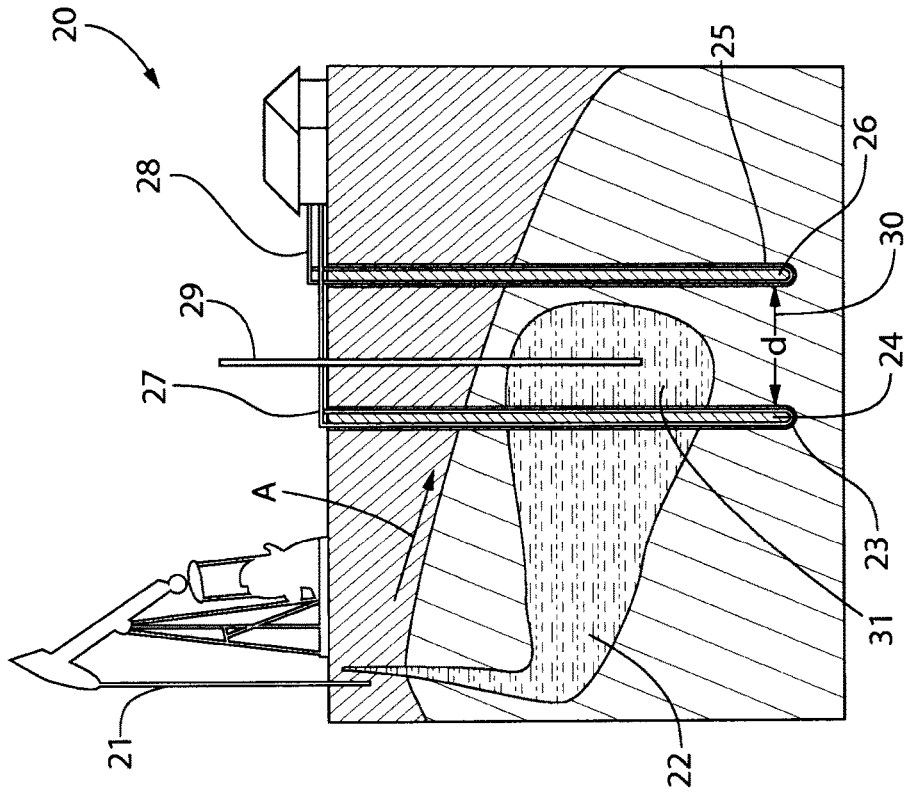
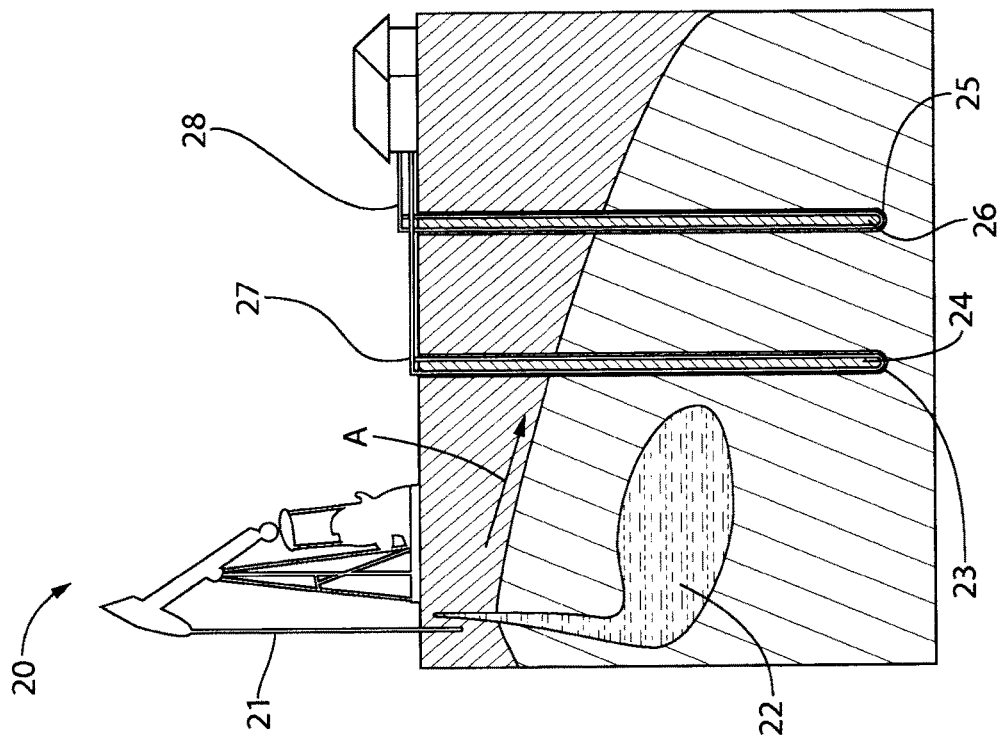

POLYMER COATED SAND AND METHODS OF MANUFACTURE AND USE

CROSS-REFERENCE TO RELATED APPLICATION

This application claims priority to U.S. Provisional Application Ser. No. 61/783,625, filed 14 Mar. 2013, entitled "POLYMER COATED SAND AND METHODS OF MANUFACTURE AND USE", the entirety of which is hereby incorporated herein.

STATEMENT OF GOVERNMENT INTEREST

This invention was made with government support under Grants No. 0900588 & 1042646 awarded by the National Science Foundation (NSF). The government has certain rights in the invention.

BACKGROUND

Engineered soils are geo-materials designed to address intricate practical problems in geotechnical and geo-environmental applications. One of the key issues for geo-engineers has been to improve soil properties to mitigate indiscriminate geo-hazards, such as contaminant migration in subsurface. The common approaches include physical modification of soil minerals, chemical treatments of soil solids and pore fluids, introduction of anomalous materials, and mixing of several granular materials to achieve desired functionalities.

Advances in material science and surface chemistry permit modifying the surfaces controlled by chemical composition and conformational structure of surface coating. For instance, the surface modification with organosilanes, polymers and carbon nanotube dramatically increases hydrophobicity. Granular materials and membranes coated with functional polymers and organo-silanes can be used for separating immiscible fluids, removing oil from the surface, and sieving hazardous compounds. These approaches render permanent or stationary changes to soil properties, which are often irreversible, hence may be limited in a dynamic environment.

Further, land operations in the petroleum industry cause oil pollution by drilling, leakage from wellheads and pipelines, and overflow at gathering stations. The chemical methods that use dispersants, sorbents or solidifiers for cleanup still introduce toxic materials into the environment. Bioremediation can degrade residual hydrocarbon in secondary phase after the first cleanup, yet it can take a long time with changing nutrient and oxygen supplies. Thermal treatment is only effective to volatile compounds and complete sediment removal is often required for heavily contaminated soil. There are major challenges that remain in our capabilities to govern the fate and migration of spilled oils and oily wastes in subsurface, one of which is efficient fluid separation. Other separation methods include air sparging of non-aqueous phase liquids in contaminated soils and groundwater; liquid water transport in a gas diffusion layer (GDL) in fuel cell applications, and methane hydrate dissociation in deep marine formations. These active separation processes are costly and there are no known methods that have been demonstrated to provide sustainable treatment.

Embodiments of the present invention are directed, inter alia, to solving some of the challenges associated with existing bioremediation processes.

SUMMARY

Some embodiments of the present invention provide a system for manipulating a flowable substance, comprising: a flowable substance; a heating means; a cooling means; and a composition comprising chemically inert particles coated with a stimuli-responsive material.

Other embodiments provide a composition comprising chemically inert particles coated with a stimuli-responsive material.

Still further embodiments provide methods of remediating a spill of an environmentally hazardous substance using a composition comprising chemically inert particles coated with a stimuli-responsive material.

In some embodiments, the present invention provides methods of modifying a chemically inert particle to make it suitable for use in any one of the systems or compositions described herein.

Yet other embodiments provide methods of reducing the fluid drag of a hydrophilic substance.

BRIEF DESCRIPTION OF THE DRAWINGS

FIGS. 2 and 3 depict exemplary field applications of the systems of the present invention.

DETAILED DESCRIPTION

Figure 1:
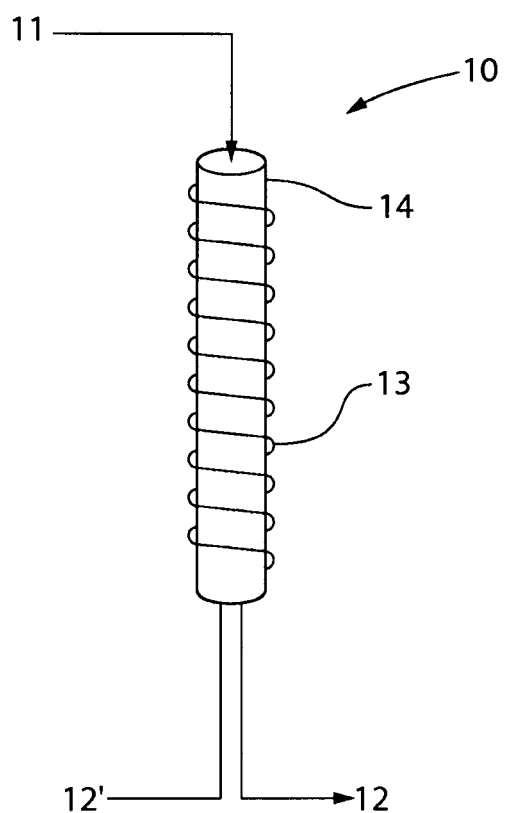
FIG. 1 depicts an embodiment of a modular pack according some embodiments of the present invention.

As used herein, the term "stimuli-responsive material" refers to a material that undergoes a change in at least one chemical property in response to a stimulus.

As used herein, the term "flowable substance" refers to solutions, suspensions, and liquid mixtures that contain hydrocarbons.

As used herein, the terms "chemically inert particle" or "chemically inert particles" refer to particles which do not interact with the environment to a measurable extent.

Some embodiments of the present invention provide a system for manipulating a flowable substance, comprising: a flowable substance; a heating means; a cooling means; and a composition comprising chemically inert particles coated with a stimuli-responsive material. In some embodiments, the flowable substance is hydrophobic.

Some embodiments of the present invention provide a system for manipulating a flowable substance, comprising: a heating means; a cooling means; and a composition comprising chemically inert particles coated with a stimuli-responsive material. In some embodiments, the flowable substance is hydrophobic.

Some embodiments of the present invention provide a system for manipulating a flowable substance, comprising: a flowable substance; a heating means; and a composition comprising chemically inert particles coated with a stimuli-responsive material. In some embodiments, the flowable substance is hydrophobic.

Some embodiments of the present invention provide a system for manipulating a flowable substance, comprising: a heating means; and a composition comprising chemically inert particles coated with a stimuli-responsive material. In some embodiments, the flowable substance is hydrophobic.

In some embodiments, the stimuli-responsive material is selected from a solvent-responsive material; a thermally-responsive material; a pH-responsive material; an ionically-responsive material; an electrically responsive material; and a combination of two or more thereof. In some embodiments, the stimuli-responsive material is selected from a solvent-responsive polymer; a thermally-responsive polymer; a pH-responsive polymer; an ionically-responsive polymer; an electrically responsive polymer; and a combination of two or more thereof.

In some embodiments, the stimuli-responsive material is selected from: a poly(3-alkylthiophene); poly[1-(trimethyl-silyl)-1-propyne; a poly(3-alkoxy-4-methylthiophene); a poly(3-alkylthiophene); poly[3-oligo(oxyethylene)-4-methylthiophene]; poly(N-isopropylacrylamide); poly(N-isopropylacrylamide)-graft-polyacrylic; poly-N-[tris(hydroxymethyl)methyl] acrylamide; poly(butylmethacrylate); poly(acrylic acid); poly(N,Ndimethylaminoethyl methacrylate); polythiophene; poly(p-phenylene vinylene); poly[3-oligo(oxyethlene)-4-methylthiophene]; poly[3-(2-methyl-1-butoxy)-4-metylthiophene]; a poly(3,4-alkylenedioxythiophene); and a combination of two or more thereof.

In some embodiments, the stimuli-responsive material comprises a thermally-responsive material. In some embodiments, the thermally-responsive material is a thermally-responsive polymer.

In some embodiments, the heating means is selected from: a heating coil; a fluid; a gas; a chemical; and a combination of two or more thereof. In some embodiments, the heating means comprises a fluid passageway filled with a heated fluid. In some embodiments, the heat fluid comprises water. In some embodiments, the heating means comprises a heating coil.

In some embodiments, the cooling means is selected from: a fluid; a gas; a chemical; a fan; and a combination of two or more thereof. In some embodiments, the cooling means comprises a fluid passageway filled with a cooled fluid. In some embodiments, the cooled fluid comprises water. In some embodiments, the cooling means comprises a refrigerant.

In some embodiments, the heating means heats the composition comprising chemically inert particles coated with a thermally-responsive material. In some embodiments, the heating means heats the composition comprising chemically inert particles coated with a thermally-responsive material to a temperature greater than or equal to the low critical solubility temperature of the thermally-responsive material. In some embodiments, the heating means heats the composition comprising chemically inert particles coated with a thermally-responsive polymer. In some embodiments, the heating means heats the composition comprising chemically inert particles coated with a thermally-responsive polymer to a temperature greater than or equal to the low critical solubility temperature of the thermally-responsive polymer.

In some embodiments, the thermally-responsive polymer exhibits a high solubility at a lower temperature and exhibits a sharp transition to a lower solubility coefficient at a higher temperature. In some embodiments, the thermally-responsive polymer may be a thermally-responsive homopolymer or a co-polymer comprising two or more such thermally-responsive monomers, or a copolymer made up of a mixture of monomers such that at least one monomer is thermally-responsive and at least one monomer is non-thermally-responsive, (i.e. the latter would give a clear water-soluble solution over all temperature ranges). The introduction of one or more non-thermally-responsive monomers into an otherwise thermally-responsive polymer matrix, enables the solvation/desolvation transition to be varied over a wide range of temperature, e.g. from 32° C. to the boiling point of water, in the case of poly-NIPAM.

In some embodiments, the thermally-responsive polymer is selected from unsubstituted or substituted poly-N-alkylacrylamides, wherein the alkyl group contains from 2 to 6 carbon atoms, copolymers of N-alkylacrylamides such as poly-NIPAM-co-acrylic acid, polyhydroxypropylcellulose, PNVCap or a polyvinyl-methylether or a combination thereof, e.g. poly-NIPAM.

In some embodiments, the temperature at which the thermal transition takes place may be adjusted not only by copolymerization with a monomer showing less or no thermal response but also by changing the composition of the thermally-responsive monomer. For example, derivatives of poly-NIPAM in which the isopropyl group is made more or less hydrophobic would change the temperature at which the thermal response occurs (as demonstrated, for example, in J. Mater. Chem., 2005, 15, 2796-2800, "Development of fluorescent microgel thermometers based on thermo-responsive polymers and their modulation of sensitivity range." Kaoru Iwai, Yuriko Matsumura, Seiichi Uchiyama and A. Prasanna de Silva).

In some embodiments, the system further comprises a first barrier. In some embodiments, the system further comprises a second barrier. In some embodiments, the first barrier comprises a modular pack. In some embodiments, the second barrier comprises a modular pack. In some embodiments, the first barrier and second barrier each comprise a modular pack. In some embodiments, the modular pack contains the composition comprising chemically inert particles coated with a thermally-responsive material. In some embodiments, the first and second barriers comprise a plurality of modular packs.

In some embodiments, the system further comprises a reservoir for collecting the flowable substance. In some embodiments, the reservoir is positioned between the first barrier and the second barrier.

In some embodiments, a heating means heats the composition comprising chemically inert particles coated with a thermally-responsive polymer to a temperature greater than or equal to the low critical solubility temperature of the thermally-responsive polymer, and the cooling means cools the composition comprising chemically inert particles coated with a thermally-responsive polymer to a temperature below the low critical solubility temperature of the thermally-responsive polymer.

In some embodiments, the low critical solubility temperature of the thermally-responsive polymer is about 32° C.

In some embodiments, the system further comprises a borehole. In some embodiments, the borehole is positioned between the first barrier and the second barrier. In some embodiments, the borehole is positioned within the reservoir.

The modular packs suitable for use in the systems of the present invention can be of any shape or size and can be custom designed for a particular field application. The modular packs can also be made of any material, as long as the material does not alter or interact with the compositions described herein.

In some embodiments, the present invention provides a modular pack comprising: a composition comprising a chemically inert particle coated with a stimuli-responsive material; a fluid inlet; a fluid outlet; and a heating means. In some embodiments, the modular pack further comprises a cooling means. In some embodiments, the modular pack comprises a combination of a heating means and a cooling means.

In some embodiments, the modular pack comprises a Y-valve, having a single fluid inlet and two fluid outlets. In some embodiments, the Y-valve comprises a wire mesh for holding stimuli-responsive material coated particles.

FIG. 1 illustrates a modular pack 10 according to some embodiments of the present invention. As shown in FIG. 1, the modular pack 10 is in the form of a column 14 having a fluid inlet 11, a fluid outlet providing an outlet for a hydrophobic flowable substance and a hydrophilic flowable substance (12 and 12'), and a heating means 13, wherein the composition comprising a chemically inert particle coated with a stimuli-responsive material is contained within the column 14.

FIGS. 2 and 3 illustrate an exemplary field application of the system 20 according to some embodiments of the present invention, wherein an environmentally hazardous substance 21 is creates a subterranean contaminant plume 22. As shown in FIGS. 2 and 3, the heating means 27 heats the modular packs of the first barrier 24 to a temperature above the low critical solubility temperature of the thermally-responsive polymer, which permits the hydrophobic flowable substance to flow in the direction of the ground water flow A, and pass through the first barrier 23 comprising the modular packs 24 containing a composition comprising a chemically inert particle coated with a stimuli-responsive material, into the reservoir 30 (defined by distance d). The system described in FIGS. 2 and 3 also includes a cooling means 28 which cools the modular packs of the second barrier 26 to a temperature below the low critical solubility temperature of the thermally-responsive polymer, which permits ground water to pass through, while retaining the hydrophobic flowable substance between the first barrier 23 and second barrier 25, in the reservoir 30. A borehole 29 is then used to extract the filtered oil contaminant 31.

In some embodiments, for example as shown in FIGS. 2 and 3, the heating means 27 is positioned downstream from the contaminant plume 22, in the path of the ground water flow A. In some embodiments, the cooling means 28 is positioned downstream from the heating means 27, in the path of the ground water flow A.

In some embodiments, the flowable substance is an environmentally hazardous substance or material. In some embodiments, the flowable substance is a petroleum-based substance. In some embodiments, the system further comprises a pump for extracting the flowable substance from the reservoir.

Other embodiments provide a composition for manipulating a flowable substance comprising a chemically inert particle coated with a stimuli-responsive material.

In some embodiments, the chemically inert particle has a diameter of greater than about 0.0001 mm. In some embodiments, the chemically inert particle has a diameter of greater than about 0.001 mm. In some embodiments, the chemically inert particle has a diameter of greater than about 0.01 mm. In some embodiments, the chemically inert particle has a diameter of greater than about 0.1 mm. In some embodiments, the chemically inert particle has a diameter of from about 0.0005 mm to about 0.007 mm. In some embodiments, the chemically inert particle has a diameter of from about 0.1 mm to about 0.75 mm. In some embodiments, the chemically inert particle has a diameter of about 0.1 mm. In some embodiments, the chemically inert particle has a diameter of 0.11 mm. In some embodiments, the chemically inert particle has a diameter of 0.72 mm.

In some embodiments, greater than about 5% of the surface area of the chemically inert particle is coated with the stimuli-responsive material. In some embodiments, greater than about 10% of the surface area of the chemically inert particle is coated with the stimuli-responsive material. In some embodiments, greater than about 15% of the surface area of the chemically inert particle is coated with the stimuli-responsive material. In some embodiments, greater than about 20% of the surface area of the chemically inert particle is coated with the stimuli-responsive material. In some embodiments, greater than about 25% of the surface area of the chemically inert particle is coated with the stimuli-responsive material. In some embodiments, greater than about 30% of the surface area of the chemically inert particle is coated with the stimuli-responsive material. In some embodiments, greater than about 35% of the surface area of the chemically inert particle is coated with the stimuli-responsive material. In some embodiments, greater than about 40% of the surface area of the chemically inert particle is coated with the stimuli-responsive material. In some embodiments, greater than about 45% of the surface area of the chemically inert particle is coated with the stimuli-responsive material. In some embodiments, greater than about 50% of the surface area of the chemically inert particle is coated with the stimuli-responsive material. In some embodiments, greater than about 55% of the surface area of the chemically inert particle is coated with the stimuli-responsive material. In some embodiments, greater than about 60% of the surface area of the chemically inert particle is coated with the stimuli-responsive material. In some embodiments, greater than about 65% of the surface area of the chemically inert particle is coated with the stimuli-responsive material. In some embodiments, greater than about 70% of the surface area of the chemically inert particle is coated with the stimuli-responsive material. In some embodiments, greater than about 75% of the surface area of the chemically inert particle is coated with the stimuli-responsive material. In some embodiments, greater than about 80% of the surface area of the chemically inert particle is coated with the stimuli-responsive material. In some embodiments, greater than about 85% of the surface area of the chemically inert particle is coated with the stimuli-responsive material. In some embodiments, greater than about 90% of the surface area of the chemically inert particle is coated with the stimuli-responsive material. In some embodiments, greater than about 95% of the surface area of the chemically inert particle is coated with the stimuli-responsive material.

In some embodiments, the chemically inert particle is hydrophilic. In some embodiments, the chemically inert particle is selected from: silica sand, silt and clay.

In some embodiments, the stimuli-responsive material provides a coating having a thickness of greater than about 5 nm. In some embodiments, the stimuli-responsive material provides a coating having a thickness of less than about 20 nm. In some embodiments, the stimuli-responsive material provides a coating having a thickness of from about 5 nm to about 20 nm.

In some embodiments, the chemically inert particle is coated using an atom transfer radical polymerization technique. In some embodiments, the chemically inert particle is coated using a surface initiated atom transfer radical polymerization technique.

In some embodiments, the compositions of the present invention can be used to: (i) form a smart hydrological barrier (a granular valve that can be turned on-off by external control to function as a tunable permeable barrier or an alternative liner); (ii) detect and sense contaminant plumes (intelligent natural filter that responds to change in pH, and/or chemical content of permeating fluid); (iii) control contaminant remediation material (controlled release of organic materials as an intelligent bio-filter to concentrate microorganism for bioremediation or arrest pathogen mitigation); (iv) selectively separate fluids (intelligent fluid separator to retain or discharge a selected fluid from a mixture of immiscible fluids—e.g. from oil-spills—or to enhance oil recovery in production wells).

One of the main features of the engineered geo-material or smart soil proposed for the above applications is its surface wettability. The degree of surface wettability and its influence in multi-phase flow and mass transport in natural soils is an important subject matter that has influenced the research and development in modern geo-environmental engineering including subsurface contamination, mitigation of geo-hazards, energy recovery, and environmental remediation.

In some embodiments, the compositions described herein are used to line the outside of a pipeline carrying hazardous hydrophobic materials. In some embodiments, the compositions of the present invention are used to separate hydrophobic and hydrophilic materials in a laboratory setting. In some embodiments, the compositions of the present invention are used to form a tunable permeable barrier which serves as a liner for a landfill.

In some embodiments, the present invention provides an intelligent fluid separator capable of retaining or discharging a selected fluid from a mixture of immiscible fluids to mitigate environmental contamination from oil-spills or to enhance oil recovery, comprising any one of the compositions described herein.

In some embodiments, the present invention provides a bio-filter comprising any one of the compositions described herein, which provides controlled release of organic materials to concentrate microorganisms for bioremediation and/or pathogen mitigation.

The invention will be described in greater detail by way of specific examples. The following examples are offered for illustrative purposes and are not intended to limit the invention in any manner. Those skilled in the art will readily recognize a variety of noncritical parameters, which can be changed or modified to yield essentially the same results.

EXAMPLES

Example 1

Glass slides are cut into small pieces (~1×1 cm$^2$). Sand particles are washed with a mixture of 98% sulphuric acid and 30% hydrogen peroxide with volume ratio of 3:1 to remove organic contaminants from the surface. The sand particles are rinsed with copious amount of deionized water, and vacuum dried. The sand particles are then immersed into 1% wt APTES solution of toluene under room temperature for 12 hours, rinsed with toluene and acetone several times to remove the residual silane, and vacuum dried.

The cleaned sand particles are put into a solution of dichloromethane containing 2% w/v pyridine. The mixture is cooled to 0° C. Initiator BiB is added dropwise to the solvent containing substrates at 0° C. The mixture is kept for 1 hour, and the temperature is increased to room temperature and maintained for 12 hours. The sand particles are cleaned with toluene and acetone, and vacuum dried.

Prior to use, all solutions and flasks are thoroughly flushed with nitrogen gas to remove oxygen. A solution of 2.5 g NIPAAm dissolved in a mixture of 10 ml H$_2$O and 10 ml MeOH is prepared. The solution is vacuum degassed with magnetic stirring. Then the sand particles with initiator grafted on the surface are immersed in a monomer solution with nitrogen gas purging. The organometallic catalyst system is prepared by adding Cu$^r$Br 31.7 mg (0.23 mmol) to a solution of 114.9 mg PMDETA in 1 ml Methanol, followed promptly by nitrogen gas blowing to prevent Cu$^+$ from being oxidized. The system is then sonicated for 1-2 minutes to let the Cu$^r$Br powder fully dissolve and facilitate the formation of a Cu$^r$Br/PMDETA complex. The molar ratio between monomer/Cu$^+$/ligand is kept as 100/1/3, and the volume ratio of MeOH to water is fixed to 1/1. The catalyst solution is introduced into polymerization solution through a cannular tube with nitrogen gas purging to eliminate oxygen. The system is put in a 60° C. water bath for 2 hours for the polymerization. When the synthesis is finished, the sand particles are filtered out and rinsed with acetone and DI water.

Example 2

Contact angles of water are measured for polyNIPAAm modified glass slides under temperatures below and above the low critical solution temperature (LCST) of the polymer. At below LCST (~32° C.), the surface is hydrophilic with a contact angle of around 30 degrees. When the substrate is slightly heated above the LCST (>32° C.), the surface changes its water affinity sharply and turns hydrophobic with a contact angle greater than 90 degrees. Results of the water contact angle test demonstrate that macro-scale behavior of a surface can be altered by modifying its property at a nano-scale.

Example 3

A water penetration test is conducted to demonstrate the wettability change induced by temperature on surface modified sands. Both fine (0.11 mm) and coarse (0.72 mm) sands are coated with polyNIPAAm using a surface initiated ATRP technique described in Example 1. Small amounts of fine and coarse sand are placed into two vials immersed in a water bath as a temperature control device. The water bath is heated to a constant temperature of about 50° C., and the temperature of the sands is monitored. When the sand temperature reaches 50° C., several drops of water are placed on top of the dry sand. At elevated temperature, the water pools and floats on top of the sand, indicating that the modified surface is hydrophobic. Due to the thermally triggered change of surface tension, the sand surface prevents water from infiltrating through the sample. The samples are then cooled to a temperature of about 20° C. At this temperature, the polymer coated sands turn hydrophilic and the pooled water penetrates the sand samples rendering them fully saturated.

The results of the water penetration test demonstrate the switchable and fully reversible wettability triggered by thermal stimuli.

Example 4

PNIPAAm is synthesized following the procedure of Example 1 and the thickness of each film is measured sequentially. Table 1 (below) describes the measured thickness of each film following each phase of the procedure.

TABLE 1

| Substrate | SiO$_2$ | SiO$_2$—NH$_2$ | SiO$_2$-PNIPAAm |
|---|---|---|---|
| Thickness (mm) | 2.237 | 19.204 | 18.991 |

Example 5

Saturated flow through sand packs comprised of three different particle sizes. For each type of sand, hydraulic conductivity is computed based on the average of the conductivities obtained under three separate hydraulic gradients. As observed, other than the fine sand column (Ottowa F-110), the hydrophobic sands display faster conduction than their hydrophilic counterparts at full saturation. Water flows faster against the hydrophobic than hydrophilic surface as the particle size increases. The results of the saturated flow test demonstrate how a hydrophobic surface enhances surface flow through conversion of the boundary flow from a "non-slip mode" to "slip mode". A slip-mode boundary means that at the point where liquid and surface contacts fluid has the velocity along the flow direction. The slip-mode boundary flow significantly reduces the fluid drag, and results in a "shark skin" effect.

Figure 4:
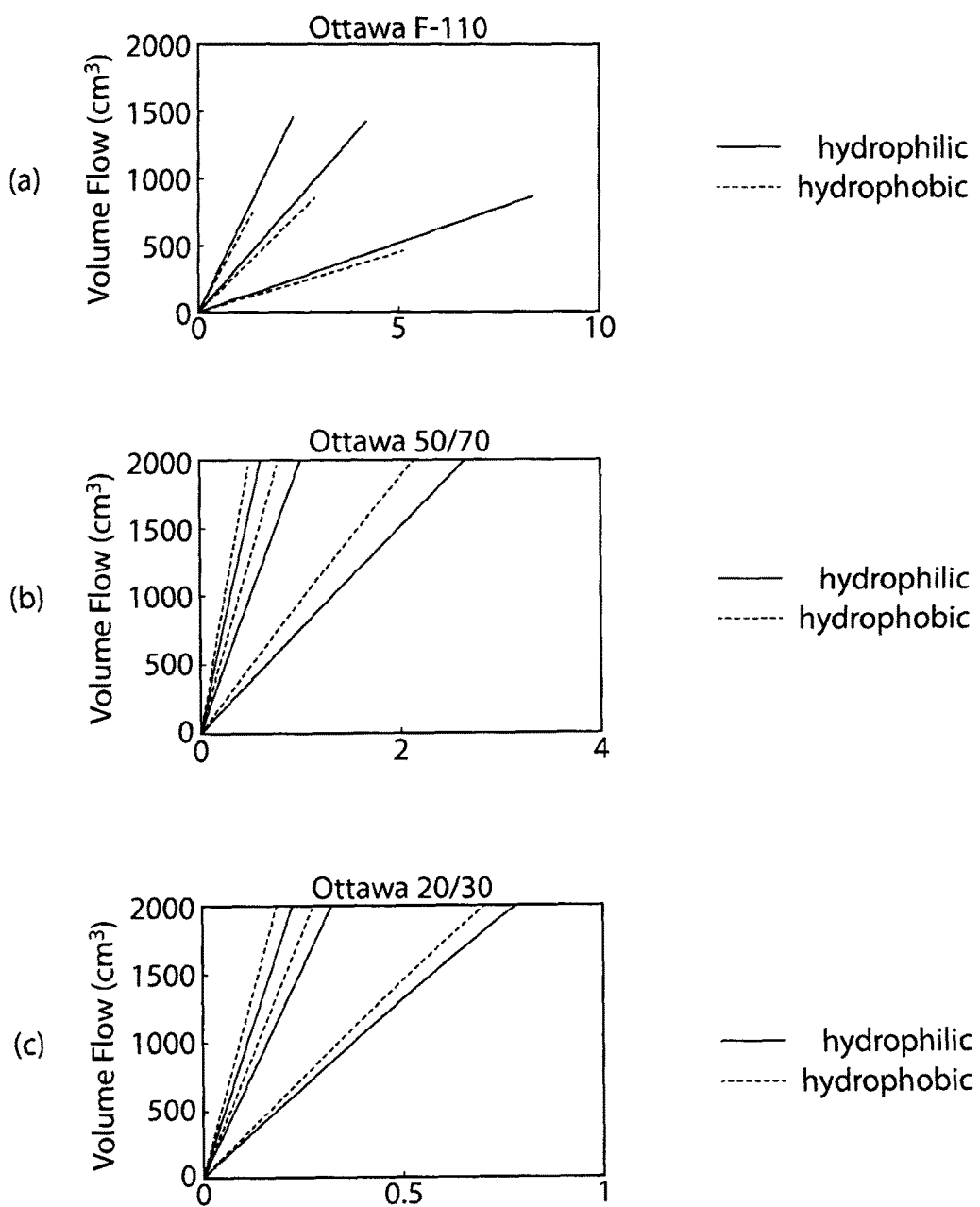
FIGS. 4(a), (b) and (c) depict a transient record of water volume invading saturated sand columns of three different particle sizes at three different constant hydraulic heads.

The graphs depicted in FIG. 4 illustrate a transient record of water volume invading saturated sand columns of three different particle sizes at three different constant hydraulic heads.

As shown by the graphs depicted in FIG. 4, hydraulic conductance increased about 20% for the two sand packs comprising sand particles having a size of 0.31 mm and 0.72 mm.

It is intended that any patents, patent applications or printed publications, including books, mentioned in this patent document be hereby incorporated by reference in their entirety.

As those skilled in the art will appreciate, numerous changes and modifications may be made to the embodiments described herein, without departing from the spirit of the invention. It is intended that all such variations fall within the scope of the invention.

The invention claimed is:

1. A system for manipulating a flowable substance, comprising:
    a flowable substance;
    a heating means;
    a cooling means; and
    a composition comprising chemically inert particles coated with a stimuli-responsive material.

2. The system of claim 1, further comprising a first barrier and a second barrier.

3. The system of claim 2, wherein the first barrier and second barrier each comprise a modular pack.

4. The system of claim 3, wherein the modular packs contain the composition comprising chemically inert particles coated with a stimuli-responsive material.

5. The system of claim 3, wherein the modular pack of the first barrier comprises the heating means.

6. The system of claim 3, wherein the modular pack of the second barrier comprises the cooling means.

7. The system of claim 1, wherein the heating means is selected from: a heating coil; a fluid; a gas; a chemical; and a combination of two or more thereof.

8. The system of claim 1, wherein the cooling means is selected from: a fluid; a gas; a chemical; a fan; and a combination of two or more thereof.

9. The system of claim 3, wherein the first barrier and second barrier each comprise a plurality of modular packs.

10. The system of claim 1, wherein said flowable substance is a petroleum-based substance.

11. The system of claim 1, wherein the stimuli-responsive material is selected from: a solvent-responsive polymer; a thermally-responsive polymer; a pH-responsive polymer; an ionically-responsive polymer; an electrically responsive polymer; and a combination of two or more thereof.

12. The system of claim 1, wherein the stimuli-responsive material is selected from: a poly(3-alkylthiophene); poly[1-(trimethylsilyl)-1-propyne; a poly(3-alkoxy-4-methylthiophene); a poly(3-alkylthiophene); poly[3-oligo(oxyethylene)-4-methylthiophene]; Poly(N-isopropylacrylamide); poly(N-isopropylacrylamide)-graft-polyacrylic; poly-N-[tris(hydroxymethyl)methyl] acrylamide; poly(butylmethacrylate); poly(acrylic acid); poly(N,Ndimethylaminoethyl methacrylate); polythiophene; poly(p-phenylene vinylene); poly[3-oligo(oxyethlene)-4-methylthiophene]; poly[3-(2-methyl-1-butoxy)-4-metylthiophene]; a poly(3,4-alkylene-dioxythiophene); and a combination of two or more thereof.

13. The system of claim 2, further comprising a reservoir positioned between the first barrier and the second barrier.

14. The system of claim 13, further comprising a borehole for extracting the flowable substance from the reservoir.

* * * * *